United States Patent [19]

Kramer

[11] 4,289,371

[45] Sep. 15, 1981

[54] OPTICAL SCANNER USING PLANE LINEAR DIFFRACTION GRATINGS ON A ROTATING SPINNER

[75] Inventor: Charles J. Kramer, Pittsford, N.Y.

[73] Assignee: Xerox Corporation, Stamford, Conn.

[21] Appl. No.: 44,000

[22] Filed: May 31, 1979

[51] Int. Cl.³ .................................................. G02B 27/17
[52] U.S. Cl. ........................... 350/3.71; 350/6.2; 350/6.7; 350/162 R; 350/320
[58] Field of Search .................. 350/3.70, 3.71, 3.72, 350/6.2, 6.3, 6.5, 6.7, 162 R, 320

[56] References Cited

U.S. PATENT DOCUMENTS

| | | | |
|---|---|---|---|
| 3,721,486 | 3/1973 | Bramley | 350/6.1 |
| 3,721,487 | 3/1973 | Pieuchard et al. | 350/3.71 |
| 3,795,768 | 3/1974 | Locke | 350/3.71 X |
| 3,940,202 | 2/1976 | Kato et al. | 350/3.71 |
| 3,953,105 | 4/1976 | Ih | 350/3.71 |
| 4,067,639 | 1/1978 | Kramer | 350/6.9 |
| 4,094,575 | 6/1978 | Kellie | 350/3.67 |
| 4,094,576 | 6/1978 | Heiling | 350/3.71 |
| 4,106,844 | 8/1978 | Bryngdahl et al. | 350/6.2 |
| 4,113,343 | 9/1978 | Pole et al. | 350/3.71 |
| 4,121,882 | 10/1978 | White | 350/3.71 |
| 4,133,600 | 1/1979 | Russell et al. | 350/3.72 |
| 4,239,326 | 12/1980 | Kramer | 350/3.71 |
| 4,243,293 | 1/1981 | Kramer | 350/3.71 |

OTHER PUBLICATIONS

Cindrich, "Image Scanning by Rotation of a Hologram," *Applied Optics*, vol. 6, No. 9, Sep. 1967, pp. 1531–1534.
McMahon et al., "Light Beam Deflection Using Holographic Scanning Techniques," *Appl. Optics*, vol. 8, No. 2, Feb. 1969, pp. 399–402.
Latta, "Computer-Based Analysis of Hologram Imagery and Aberrations ...," *Applied Optics*, vol. 10, No. 3, Mar. 1971, pp. 599–618.
Harrison et al., "750-mm Ruling Engine Producing Large Gratings ...," *J.O.S.A.*, vol. 62, No. 6, Jun. 1972, pp. 751–756.
Loewen, "Diffraction Gratings," *Optical Engineering*, vol. 15, No. 5, Sep.–Oct. 1976, pp. 446–450.
Loewen et al., "Grating Efficiency Theory as It Applies to ...," *Applied Optics*, vol. 16, No. 10, Oct. 1977, pp. 2711–2721.
George et al., "Holographic Diffraction Gratings," *Applied Physics Letters*, vol. 9, No. 5, Sep. 1966, pp. 212–215.

*Primary Examiner*—John K. Corbin
*Assistant Examiner*—John D. Lee

[57] ABSTRACT

An optical scanning system including a spinner containing at least one plane linear diffraction grating. As the spinner is rotated, a plane reconstruction wave of wavelength $\lambda_r$ is directed onto the grating creating a diffracted wavefront which can be focused onto an image plane. The grating is constructed so that the ratio of the reconstruction wavelength $\lambda_r$ to the grating period d is a value lying between the range of 1 and 1.618. The angles of incidence and diffraction of the reconstruction wavefront in a preferred embodiment, approximate 45°.

17 Claims, 15 Drawing Figures

OPTICAL SCANNER USING PLANE LINEAR DIFFRACTION GRATINGS ON A ROTATING SPINNER

BACKGROUND OF THE INVENTION

The present invention relates to an optical scanning system and more particularly, to a system which uses a rotating spinner, having at least one plane linear diffraction grating formed thereon, as the scanning element.

The high brightness characteristics of laser illumination has stimulated interest in sequential optical scanning and has resulted in systems capable of generating high resolution images at high scan rates. These systems have typically used galvanometers, rotating mirrors, acousto-optic or electro-optic elements and rotating holograms as the light spot deflecting elements. Holographic scanning has come to be preferred for many applications due to simplicity of the mechanical geometry, ease and economy of fabrication and higher resolution and scanning speed.

One form of prior art holographic scanner is typically made by holographically forming a plurality of zone-type lenses on the surface of a rotatable disc. The lenses act to focus normally incident reconstruction beams at a locus of focal points which define a desired scan line. Examples of such scanners are found in the systems disclosed by McMahon et al. "Light Beam Deflection Using Holographic Scanning Techniques," Applied Optics, pp. 399–401, Vol. 8, No. 2, Feb. 1969, and U.S. Pat. No. 3,953,105 (Ih). These prior art spinners are subject to certain inherent problems, a principal one being scan line "bow". As the spinner is rotated in the reconstruction mode, the locus of the reconstructed point source is a circle in space. If the image plane is a flat sheet positioned tangentially to the scan circle, the loci of the scan incident on the sheet is, in general, a curved or bowed line. Various solutions have been used to overcome this problem but each has its own drawbacks. A curved image plane can be used in applications where the imaging plane is sufficiently flexible but excluded would be the use of an imaging member such as a xerographic drum. Additional optics can be utilized as proposed by Ih in U.S. Pat. No. 3,953,105 but this type of system is difficult to align and is sensitive to spinner decentration errors.

Another problem is that the spinner is subject to a wobble effect which results in formation of colinear multiple scan lines. This problem has been addressed by the applicant in copending applications, U.S. Ser. No. 708,245 (U.S. Pat. No. 4,239,326) and 921,409 (U.S. Pat. No. 4,243,293) which disclose solutions based on wobble invariance obtained through specific optical geometries. U.S. Pat. No. 4,067,639 and copending application U.S. Ser. No. 921,411 (now abandoned), by the same applicant disclose spinner mounting techniques for reducing wobble.

A third problem not addressed by any of the prior zone-type plate systems, is that of spinner decentration. If the facets (lenses) of a spinner are decentered due to initial fabrication and/or mounting, during the scan mode, the focal position of the facet will oscillate causing output scan distortion.

A fourth problem is chromatic aberration resulting from a wavelength shift in the reconstruction beam, i.e. the image is reconstructed at a wavelength different from the one used for construction. One technique known for compensating for this is the simulated computer holographic lens design programs disclosed by J. N. Latta in his article "Computer-based Analysis of Hologram Imagery and Aberrations", Applied Optics, Vol. 10, No. 3, pp. 599–608, March 1971.

A still further problem encountered when transmission disk spinners are used as the scanning element is the influence of spinner "wedge" on scanner performance. Variations in the thickness of the substrate material, which can occur in the form of localized deviations or of a constant wedge, cause perturbations in the direction of the diffracted beams resulting in colinear multiple scan lines.

Another problem is exposure non-uniformities which may occur either within a scan line (caused, for example, by noise in the reconstruction beam) or from line-to-line (caused by grating-to-grating differences).

It can thus be observed that prior art holographic scanning systems are subject to a multiplicity of problems, many of which can at best be solved on an individual basis leaving other problems still present or can be solved at the expense of worsening existing problems or introducing new ones. In the following description, Applicant discloses a scanning system which by its construction, and playback either eliminates these problems completely or neutralizes their effects.

SUMMARY OF THE INVENTION

Applicant has, in the present application, disclosed a scanning system in which a reconstruction beam is directed in non-normal incidence against a spinner surface having formed therein at least one plane linear diffraction grating. The grating is constructed so as to have a $\lambda_r/d$ ratio ($\lambda_r$ = wavelength of the reconstruction beam; $d$ = grating period) of between 1 and 1.618. As the spinner is rotated a diffracted reconstruction wavefront is generated and, in one embodiment, focused with the aid of additional optics, onto an imaging plane.

The scanning system, although lacking the rotational symmetry possessed by prior art systems, nevertheless possesses imaging characteristics which remain nearly constant with the relative changes in reconstruction beam orientation. These characteristics include a scan trajectory which is essentially bow-free; invariance to spinner centration errors; insensitivity to angular misalignments of the spinner; ready fabrication using either holographic or conventional ruling techniques and simple wavelength conversion. Additionally, for the transmissive case, spinner wobble is eliminated if the incident and diffraction angles are made approximately equal. The influence of substrate wedge is reduced for the equal angle case. (A reflection-type spinner would be invariant to wedge effects). Also for the transmission case, higher than expected diffraction efficiencies were obtained.

DRAWINGS

DESCRIPTION

Referring to FIG. 1, the holographic formation of a single plane linear diffraction grating facet 2 on the surface of transmission type spinner 3 is shown. The gratings will hereinafter be referred to as PLDGs and the term will be understood to mean a grating having a flat surface and a constant grating period.

Figure 1A:
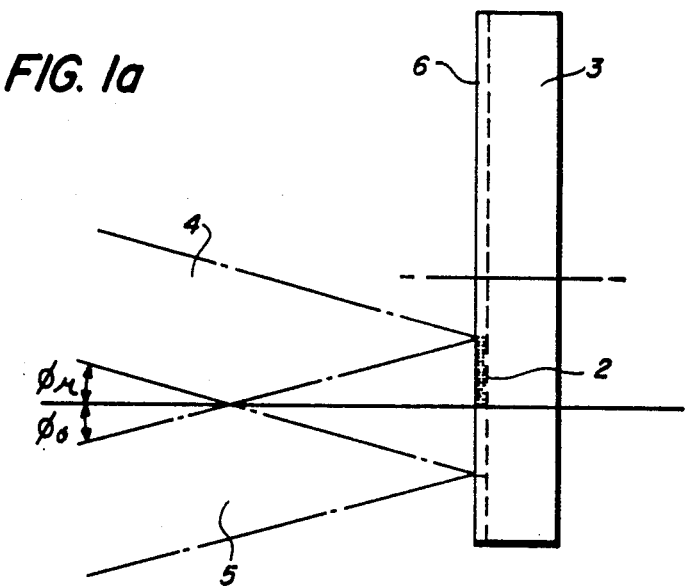
FIGS. 1a and 1b are side and top views of a plane linear diffraction grating (PLDG) formed on the surface of a transmission-type spinner.
Figure 1B:
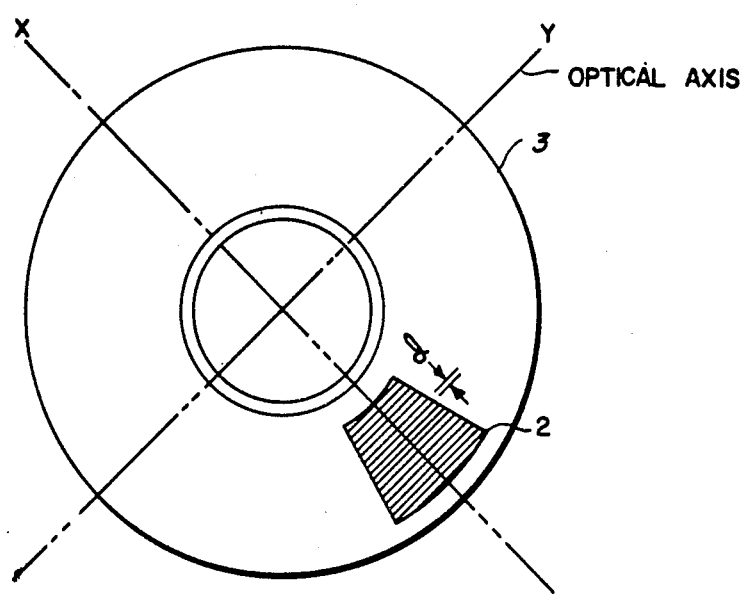

As shown in FIG. 1a, a single PLDG facet 2 is formed by directing an object wavefront 4 and a reference wavefront 5, both of which are plane waves lying in the same plane onto a recording medium 6 disposed on the surface of spinner 3. It is assumed that these beams have been split upstream and individually conditioned (spatial filtered, collimated) to the desired wavefronts. The lines of the grating, as shown in FIG. 1b are formed perpendicular to the center line of the spinner.

The choice of medium 6 is determined primarily by the resolution required to record the fringes of the interfering wavefronts. As is known in the art, spinner 3 can be indexed so that a plurality of PLDG facets 2 can be formed on its surface.

An example of a suitable material for the recording medium is a silver halide photographic emulsion; the resulting grating would be of the absorption type. If this hologram were bleached, the grating would be a phase type. The gratings formed in this material are of the volume type, either thick or thin.

According to the present invention and in a preferred embodiment, the grating is formed on the surface of medium 6 and can be characterized as a thin surface relief grating. Such a characterization means that a sinusoidal phase variation is introduced into the reconstruction wave.

Figure 2:
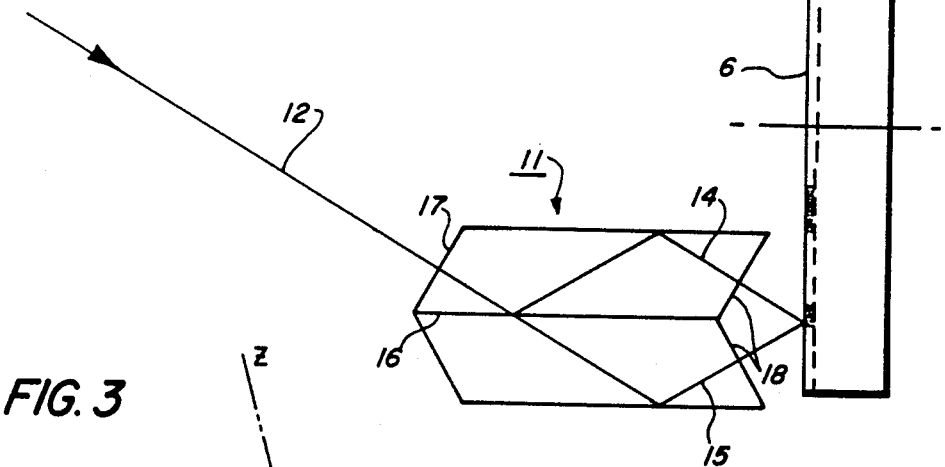
FIG. 2 shows a preferred system for making the diffraction grating.

FIG. 2 shows an embodiment for making the PLDG facets; one which results in facets having essentially identical properties. Facet uniformity is difficult to achieve due to laser power fluctuations during the sequential exposure process and/or due to differential phase fluctuations between the interfering beams during the exposures. These fluctuations typically arise following the splitting of the laser beam into object and reference beams at some upstream point and accumulates during the fairly long separate paths travelled by the beams as they interact with loosely coupled optical components. Compensation of laser power fluctuations can be achieved by monitoring the output of the laser and correcting the individual facet exposures for total energy. Compensation of the differential phase fluctuation is difficult and in theory is accomplished by monitoring an interference pattern established utilizing a portion of each of the two beams used to form the hologram and adjusting the phase of one of the beams so that the pattern is stationary in time.

In FIG. 2, preconditioned beam 12 enters prism assembly 11 and is split into beams 14 and 15 by beamsplitter 16. These beams are reflected from the sides of the prism and directed onto medium 6 of spinner 3 to form a facet as previously described in FIG. 1. To enhance high fringe contrast, the entrance and exit faces 17, 18 of the prism can be coated with an antireflection material to reduce flare light. Other embodiments are possible besides the prism assembly shown. For example, a pair of mirrors could be positioned downstream of the beamsplitter to provide reflection at the desired angle of the two wavefronts. The advantage of using the prism assembly is that the beams after the beamsplitter interact only with closely coupled optical components. Also, the path length after the beamsplitter is minimized. Other prism geometries are also possible.

Although the gratings shown in FIGS. 1 and 2 have been formed by a holographic process, they may also be formed by ruling techniques. For example, a master grating may be made with the desired grating period. Portions of the grating can then be separated into individual facets and mounted on the surface of the spinner in proper orientation with the reconstruction beam.

For the transmission grating shown in FIG. 1, the spacing between fringes d (shown greatly exaggerated) is given by the diffraction grating equation.

$$d = \frac{\lambda_f}{\sin \phi_o + \sin \phi_r} \quad (1)$$

where $\lambda_f$ is the wavelength of the forming wavefront, $\phi_o$ and $\phi_r$ are, respectively, the angles that the object and the reference waves make with the normal to the recording medium. Both beams lie in the plane defined by the spinner normal and the spinner diameter.

Figure 3:
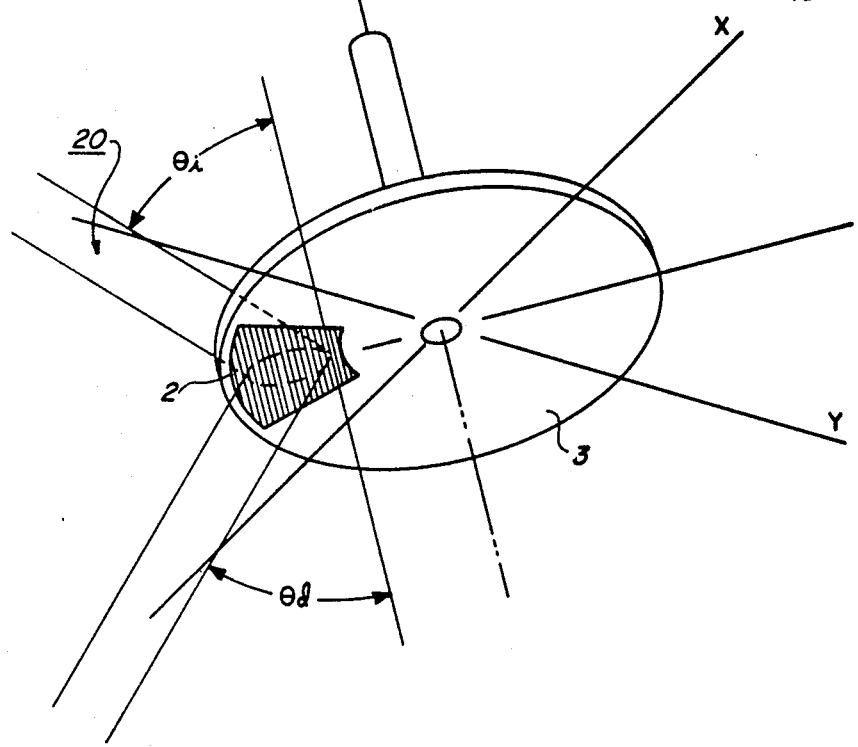
FIG. 3 is a representation of the spinner of FIG. 1 in a reconstruction mode.

FIG. 3 shows spinner 3 of FIGS. 1 and 2 located in an XY plane and rotating about a Z axis. A reconstruction wavefront 20 falls upon facet 2 at an angle of incidence $\theta_i$ and is diffracted at an angle of diffraction $\theta_d$. Under the condition where the rotation angle is zero and the grating lines of facet 2 are parallel to the X axis, the incident and diffracted rays satisfy the following general equation.

$$\sin \theta_{ix} + \sin \theta_{dx} = (\lambda_r/d) \sin \theta_R \quad (3a)$$

$$\sin \theta_{iy} + \sin \theta_{dy} = (\lambda_r/d) \cos \theta_R \quad (3b)$$

wherein $\sin \theta_{ix}$ and $\sin \theta_{iy}$ are the components of the incident reconstruction wave vector along the X and Y axes, respectively; $\sin \theta_{dx}$ and $\sin \theta_{dy}$ are the components of the diffracted wave vector along the X and Y axes; $\lambda_r$ is the wavelength of the reconstruction beam; d is the grating period and $\theta_R$ is the grating rotation angle.

Figure 4:
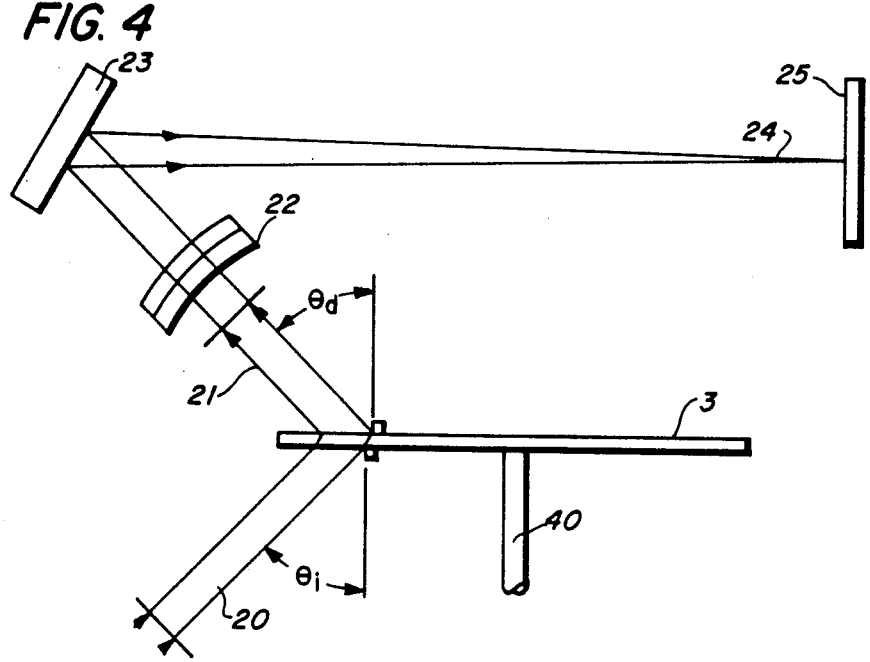
FIG. 4 is a schematic representation of a scanner system according to the invention.

FIG. 4 schematically illustrates a scanning system utilizing the transmission spinner of FIGS. 1-3. Reconstruction wavefront 20 is incident on the spinner at angle $\theta_i$ and is diffracted at an angle $\theta_d$. Since wavefront 20 is a plane wave, the diffracted wave 21 is also a plane wave which is focused by lens 22; mirror 23 directs signal beam 24 to image plane 25 which lies on the focal plane of lens 22.

As spinner 3 is rotated about shaft 40 by a motive means (not shown) which can be a conventional motor, facet 2 is rotated through wavefront 20 at some angle causing rotation of the diffracted wavefront. The focal position of signal beam 24 will be displaced vertically producing a single scan line. As additional facets are rotated through wavefront 20, additional scan lines are generated.

With a collimated reconstruction wavefront, lens 22 can be positioned as shown between the spinner and the image plane. In this position, the lens provides resolution and could provide field flattening and scan linearization. The lens can also be located upstream from the spinner in which case, beam convergence would be initiated before the spinner and continue on to focus at the image plane. A combination of a diverging lens upstream of the spinner followed by a converging lens downstream of the spinner is also possible. Finally, in certain applications where resolution requirements are not stringent, the lens may be completely eliminated.

As will be described in further detail below, the scanning system shown in FIG. 4 is capable of producing line scans at plane 25 which are almost completely bow free, are invariant with respect to any irregularities (wobble) of the surfaces of spinner 3 and are completely free of distortion due to decentration.

These simultaneous beneficial results have been obtained by deriving certain useful insights into the forming of the PLDG facets and their playback. These insights were obtained through vigorous mathematical inquiry into whether optimum scanning conditions could be obtained by forming certain relationships between grating period, playback wavelength and angles of incidence and diffraction during reconstruction.

As a first observation, however, applicant realized that the use of rotating plane linear diffraction gratings as the scanning elements would avoid one of the major causes of scan distortion in spinners with zone type lenses, that caused by decentration problems between the lenses. As an analogy, if the grooves of a record are not exactly centered, the needle moves, or accelerates, back and forth. In the fringe pattern comprising a zone lens, it is the focal point which is subject to oscillation causing distortion in the diffracted ray. Plane gratings, lacking power, are simply not subject to the centration problem. Applicant then conducted an analysis to discover whether there were other advantages in the use of PLDG as the facets. These results are described below with reference to FIGS. 5–12. For convenience, discussion of the various problems and their solutions are considered separately below.

BOW MINIMIZATION

Figure 5:
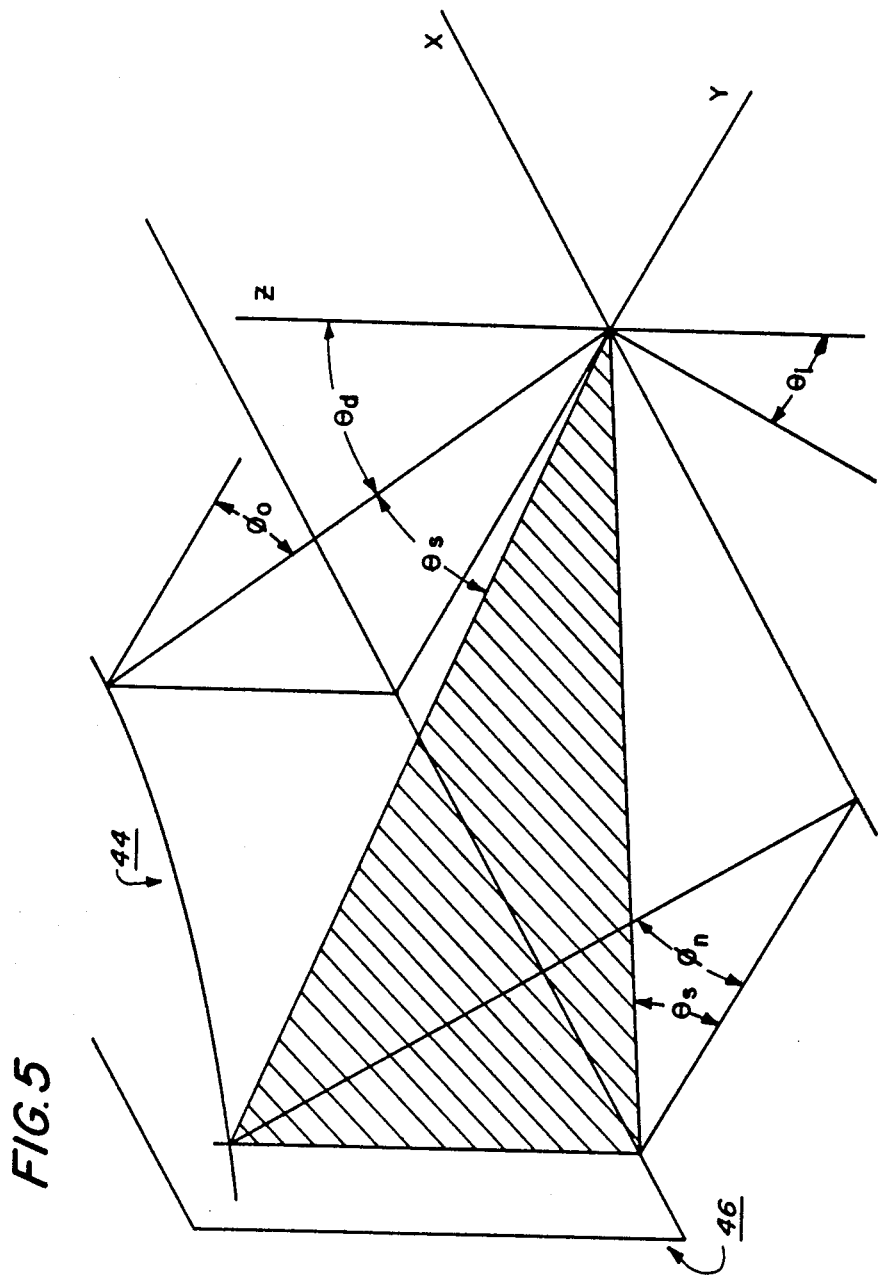
FIG. 5 is a three-dimensional representation showing the angular relationships between incident and diffracted angles and scan line of an image plane during reconstruction.
Figure 6:
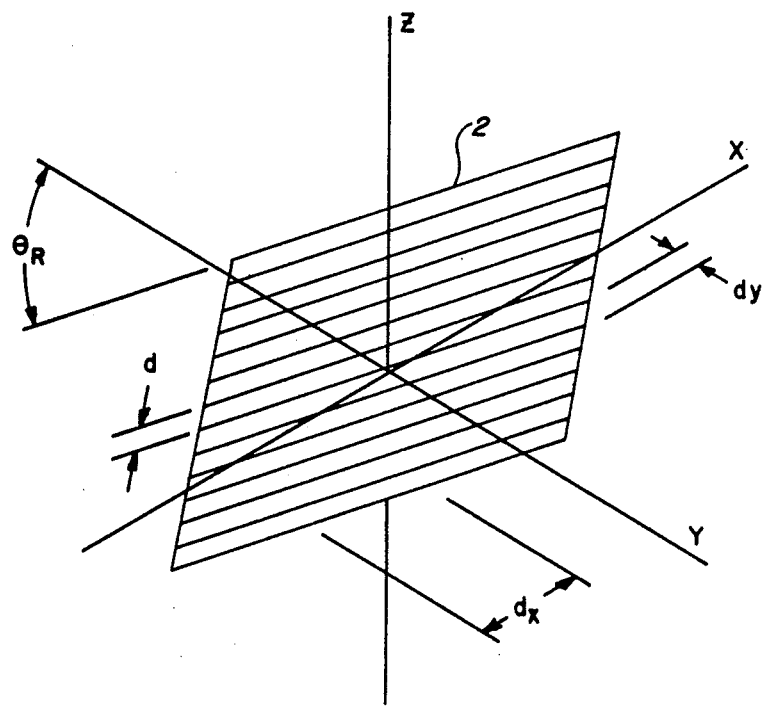
FIG. 6 is a representation of a rotating PLDG.

The first investigation was to determine whether there were any conditions under which a minimum bow in a scan line could be achieved for an oblique incident reconstruction beam. Referring to FIGS. 5 and 6 it is assumed that a PLDG facet is located in the XY plane and that it rotates about the Z axis. (In order to keep FIG. 5 as clear as possible, the facet 2 is not shown in this figure but is instead shown in FIG. 6.) The following notation conventions are observed: subscripts i and d refer to the incident and diffracted waves, respectively, subscript o indicates the parameter is defined for the case of $\theta_R$ (the grating rotation angle) $=0$; subscript n indicates the parameter is defined for $\theta_R \neq 0$; $\theta_s$ is the scan angle of the diffracted beam measured in the plane defined by the diffracted wave vector and the X axis and $\theta_s'$, is the scan angle of the diffracted beam measured in the XY plane. Incident diffracted angles for the grating are measured with regard to the grating normal (z axis). It will be assumed that the incident wave vector always lies in the YZ plane so:

$$\theta_{ix}=0 \text{ and } \theta_{iy}=\theta_i$$

With further reference to FIGS. 5 and 6 it is evident that if the diffraction angle remains constant with scan angle, the scan line 44 on image plane 46 will bow upward as indicated. In order for the scan line to become straight, $\theta_d$ must increase with scan angle. From the grating equations, $$\sin \theta_i + \sin \theta_d = \lambda_r/d \qquad (4)$$

Figure 7:
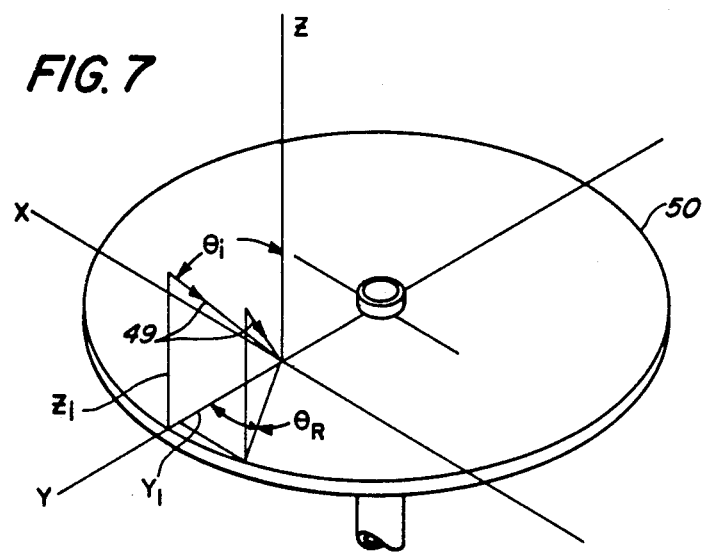
FIG. 7 is a three-dimensional representation of the relationship between apparent incidence angle and grating rotation angle.

It is apparent that in order for $\theta_d$ to increase, the incidence angle $\theta_i$ must decrease. Insight into the relationship between apparent incidence angle and grating rotation angle can be achieved with the aid of FIG. 7. To illustrate how the apparent incidence angle changes as a function of rotation angle, the spinner 50 in FIG. 7 is depicted as being kept stationary while the incident beam 49 is rotated about the Z axis while keeping the incidence angle $\theta_i$ constant. The projection of the rotated incident angle onto the YZ plane is:

$$\tan \theta_i = y_1/z_1 \cos \theta_R \qquad (5)$$

The apparent incidence angle decreases from $\theta_i$ to 0 as $\theta_R$ increases from 0° to 90°. It will be shown that if $\theta_d$ resides within a certain range, there exists a $\theta_i$ value that minimizes the scan line bow.

The first step in deriving the conditions that minimize bow is to define parameters which are useful for characterizing the magnitude of the scan line bow. It is evident from FIG. 5 that the change in the Z coordinate of the scan line is an accurate measure of the bow. Since the change in the angle $\phi_n$ is directly related to the change in the Z coordinate, the bow can be expressed in terms of this variable. From the geometric relationships depicted i FIG. 5

$$\tan \theta_n = \cot \theta_d \sec \theta_s' \qquad (6)$$

For a bow free line, $\phi_n$ is constant with regard to $\theta_s'$. To determine the conditions under which this occurs Eq. (6) is differentiated with respect to $\theta_s'$ while keeping $\phi_n$ constant:

$$d\ \theta_d = \sin \theta_d \cos \theta_d \tan \theta_s' d\ \theta_s' \qquad (7)$$

In order to solve Eq. 7, an expression is first derived to express $\theta_s$ in terms of $\theta_R$.

By definition:

$$\tan \theta_s' = x_d/y_d \qquad (8)$$

where $x_d$ and $y_d$ are the components of the diffracted wave vector along the X and Y axis, respectively. Substituting from Eq. (3) gives:

$$\tan \theta_s' = \frac{\tan \theta_R}{1 - d/\lambda_r \frac{\sin \theta_i}{\cos \theta_R}} \quad (9)$$

With the aid of FIG. 5, it can be shown that:

$$\tan \theta_s = \tan \theta_s' \sin \theta_d \quad (10)$$

$$= \frac{\tan \theta_R \sin \theta_d}{1 - d/\lambda_r \frac{\sin \theta_i}{\sin \theta_R}}$$

Additional equations are derived to approximate the conditions under which the PLDG is made. ($\theta_{RO}$). It can be demonstrated that the general relationship between $\theta_i$, $\theta_d$, $\lambda_r$ and d, for the case of minimized bow in the scan line, is given by $$\sin \theta_i = (\lambda_r/d) \cos^2 \theta_d \sec \theta_R \quad (11)$$

If $\theta_R$ is set to zero, then $E_q$(11) reduces to the following set of equations for the playback condition:

$$\sin \theta_i = \lambda_r/d - d/\lambda_r \quad (12a)$$

$$\sin \theta_d = d/\lambda_r \quad (12b)$$

It is readily apparent that these solutions depend on only the wavelength of light and the grating period.

Real solutions for $\theta_i$ and $\theta_d$ exist only for the range where:

$$-1 \leq (\lambda_r/d - d/\lambda_r) \leq 1 \quad (13)$$

and $$0 \leq d/\lambda_r \leq 1 \quad (14)$$

Since d can have only positive values, the maximum and minimum values that d can have are:

$$0.618 \leq d \leq \lambda_r \quad (15)$$

or $$1 \leq \lambda_r/d \leq 1.618 \quad (16)$$

The maximum and minimum corresponding values of $\theta_i$ and $\theta_d$ are:

$$0° \leq \theta_i \leq 89.445°$$

$$90° \geq \theta_d \geq 38.17° \quad (17)$$

The above analysis demonstrates that there is a wide range of incident and diffracted angles over which this scan line bow minimization technique can be used, although as will be shown below, certain angles are preferred.

Figure 8:
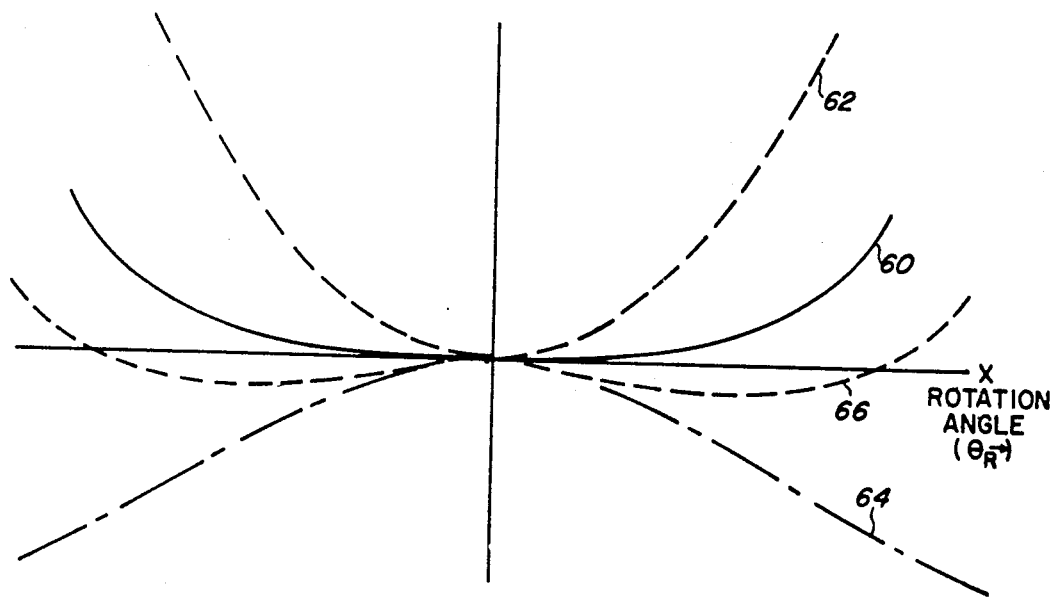
FIG. 8 is a graph plotting scan line bow deviation vs. grating rotation angle for various incident and diffraction angle values.

As is apparent from an investigation of FIG. 8, the proposed technique does not completely eliminate bow. FIG. 8 illustrates how the shape of the scan line changes as the incident angle is varied about the value predicted by Equation (12). Curve 60 indicates what the scan line would look like when the incident and diffracted angles satisfy Equation (12). The bow is essentially zero for small rotation angles but increased monotonically with rotation angle. For incident angles less than $\theta_i$ the monotonic increase in bow (curve 62) is more pronounced; for much larger incidence angles than $\theta_i$ the scan line begins to develop a fairly large negative bow as indicated by curve 64. It is, however, apparent that a minimum bow can be achieved if curve 66 can be produced. This curve first goes negative and then monotonically increases thereby developing three separate inflection points. Its deviation from an ideal straight line can be made less than curve 60 for a given rotation angle.

To achieve the minimum bow in the scan line, the scanner would be set up to produce curve 66 of FIG. 8. Since the position of the inflection points of the scan line determine the maximum bow in the line, it is important to be able to predict the location of these points. Due to the differential approach utilized to solve this problem, information about the inflection points is contained in Eq. (11). By inspection of Eqs. (11) and (12) the following more generalized equations for the incident and diffraction angles can be obtained.

$$\sin \theta_i = (\lambda_r/d - d/\lambda_r) \sec \theta_R \quad (18a)$$

$$\sin \theta_d = (1 - \sec \theta_R)\lambda_r/d + d/\lambda_r \quad (18b)$$

When the incident and diffracted angles satisfy Eq. (18) the three inflection points occur at $\theta_R = 0$ and $\pm \theta_R$. In a typical scanner arrangement the inflection points are chosen to occur at 50-65% of the maximum rotation angle per scan. The following approximation is very useful for relating the grating rotation angle to the beam scanning angle:

$$\theta_s = \theta_R / \sin \theta_d \quad (19)$$

The above analysis will enable one skilled in the art to design a system which will minimize bow regardless of whether a transmission or reflection grating scanner is used. Further investigation into the transmission grating scanner characteristics, however, has led to the discovery of a geometry where the system is *invariant* with regard to spinner wobble. It has been found that invariance occurs when $\theta_i \approx \theta_d$; by Eq. (12), $\theta_i = \theta_d = 45°$. The general relationship between the change produced in the diffraction angle, $d\theta_d$, by tilting the spinner by the angle $d\theta$ is:

$$d\theta_d = \pm [1 \mp (\cos \theta_i / \cos \theta_d)] d\theta \quad (19.1)$$

where the upper signs apply to transmission gratings and the lower to reflection gratings.

Figure 9:
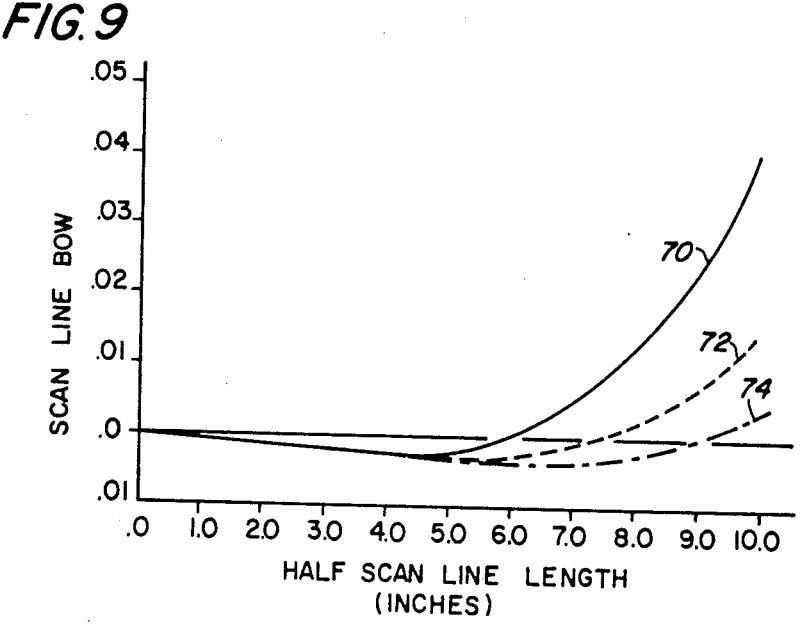
FIG. 9 is a graph plotting scan line bow as a function of distance from spinner to image plane and as a function of scan line length.

System characteristics were theoretically investigated for the following parameters: $\lambda_r/d = 1.414$; $\theta_i = 45.6°$; $\theta_d = 44.41°$. Scan line bow was calculated as a function of the distance of the spinner from the image plane and as a function of scan line length. As shown in FIG. 9, three curves 70, 72, , and 74 were plotted for three different spinner-to-image plane distances of 20", 25" and 30", respectively, with the image plane oriented so that it was perpendicular to the on-axis diffracted beam.

Figure 10:
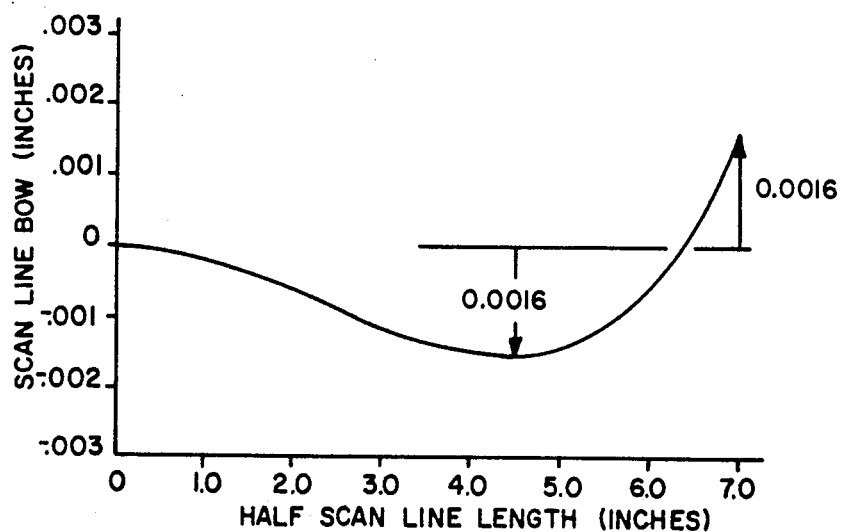
FIG. 10 is a graph plotting scan line bow for a 25" spinner-to-image plane distance.

The various calculated bow values for the different throw distances in FIG. 9 are related to the rotation angle that the spinner would have to undergo to generate the scan line length. The shorter the throw distance the larger the rotation angle for a given scan length. FIG. 10 illustrates how the bow for a 25" throw distance is minimized for a 14" scan length by optimum choice of incidence angle. In this case, $\lambda_r/d = 1.41$;

$\theta_i = 45.45°$; $\theta_d = 44.55°$. The 1.6 mils of bow in this figure is more than acceptable for most high resolution scanning applications. If a post-scan focusing lens is utilized in conjunction with the spinner, the magnitude of the bow in the image plane will be influenced by the angular magnification properties of the lens. If the lens is of a telephoto design, there will be an increase in bow, whereas the reverse is true for a wide angle design.

WEDGE

As a first comment, a spinner functioning in the reflectance mode would be invariant to wedge effects so the following discussion concerns only transmission systems. In such a system, variations in spinner thickness can occur in many forms, from localized deviations to constant wedge. The change in the diffraction angle, $d\theta_d$, due to spinner substrate wedge is:

$$d\theta d = \frac{n \cos \theta_2}{\cos \theta_d} \left[ 1 - \frac{\cos \theta_1}{\cos \theta_2} \right] dx_2 + \frac{1}{\cos \theta_d} [n \cos \theta_i - \cos \theta_i] dx_1 \quad (20)$$

where $\theta_i$ and $\theta_d$ are the incident and diffraction angles, respectively, measured in air; $\theta_1$ and $\theta_2$ are the incident and diffraction angles, respectively measured in the spinner substrate medium; n is the index of refraction of the spinner medium, and $dx_1$ and $dx_2$ are the angles by which the first and second interfaces of the spinner deviate from their ideal parallel position. Since it is difficult to measure the individual surface deviations from parallelism, wedge is usually measured and specified as the sum of these deviations. For the previously disclosed geometry where $\theta_i \theta_d$; $\theta_1 \approx \theta_2$ and, therefore, the portion of the wedge associated with the second interface of the spinner introduces no variation into the diffracted ray angle. The physical reason for this is that wedge associated with the same interface on which the grating is deposited has the same effect on the beam that wobble would and, therefore, the system is invariant with regard to it. Wedge effects would still be present however, with the other interface.

EXAMPLE

Figure 11:
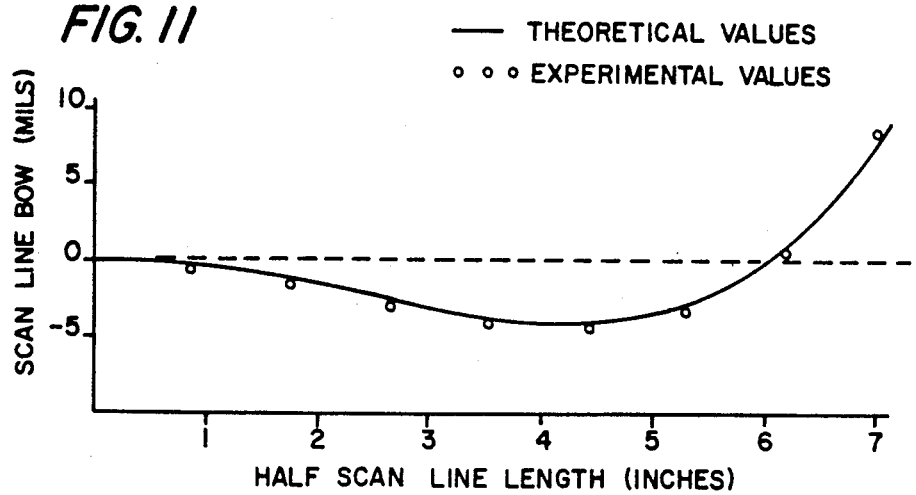
FIG. 11 is a graph plotting scan line bow as a function of scan line length for one embodiment of a scanning system.

Referring to FIGS. 1 and 4, a scanner system was constructed using a glass spinner 3, 0.125" (3.125 mm) thick and 3.75" (93.75 mm) in diameter and containing 10 PLDG facets located 1.55" (38.75 mm) from the center of the spinner. Each facet was 1 cm wide in the sagittal direction and 2.47 cm long in the tangential direction. Lens 22 has a focal length of 50.8 cm. The image plane was positioned in the focal of the lens; and $\theta_i = 48.27°$; $\theta_d = 43.37°$. The reconstruction beam was generated by red $H_e$-$N_e$ laser with a wavelength of 0.6328 μm and the grating period was 0.4416 μm. The $\lambda_r/d$ ratio in this case was 1.433. The forming wavelength is discussed in the immediately following paragraph. The system functioned in the under-filled mode and had an 84% duty cycle over a 14" write position of the scan line. FIG. 11 shows that the correlation between the measured bow and the predicted bow for this system is excellent. Since lens 22 is of the telephoto type, the magnitude of the bow has been increased by 2.4 times the nominal value it would have if the lens were not present. It is estimated that the bow depicted in FIG. 11 is marginally acceptable for scanning applications requiring about 200 lines/in.

WAVELENGTH CONVERSION

Due to the fact that a diffraction limited image is formed only when the reconstruction wavefront meets certain pre-encoded conditions required to form the holographic facet and because of the monochromatic nature of the holographic imaging process, it is difficult to achieve diffraction limited performance at wavelengths other than the forming wavelength. The previously referenced Latta article describes a complex computer designed holographic lens program capable of compensating for a wavelength shift. According to the present invention, and utilizing equations (1) and (12), this conversion process is greatly simplified. Referring to the above example, the forming beam was a $H_e$-$C_d$ laser with a wavelength of 0.4416 μm. Solving Eq. (12) for d yields an above-mentioned value of 0.4416 μm. Inserting this value and the value of $\lambda_r$(0.4416 μm) into Eq. (1) yields the making condition requirements by indicating that $\phi_o$ and $\phi_r$ must be set at 30° to provide the required conversion.

To summarize the invention up to this point, applicant has demonstrated that in an optical system utilizing a spinner having plane linear diffraction gratings the scanning elements can produce an essentially bow free scanning beam trace in which cross scan motion due to spinner decentration, wobble, and wedge could be minimized by selection of a $\lambda_r/d$ ratio of between 1 and 1.618, values for $\theta_i$ between 0° and 89.445° and for $\theta_d$ between 38.17° and 90°. In a preferred embodiment in a transmission mode $\theta_i \approx \theta_d \approx 45°$; the system is invariant to wobble. Two remaining features remain to be discussed: diffraction efficiency and exposure nonuniformities.

DIFFRACTION EFFICIENCY

Figure 12:
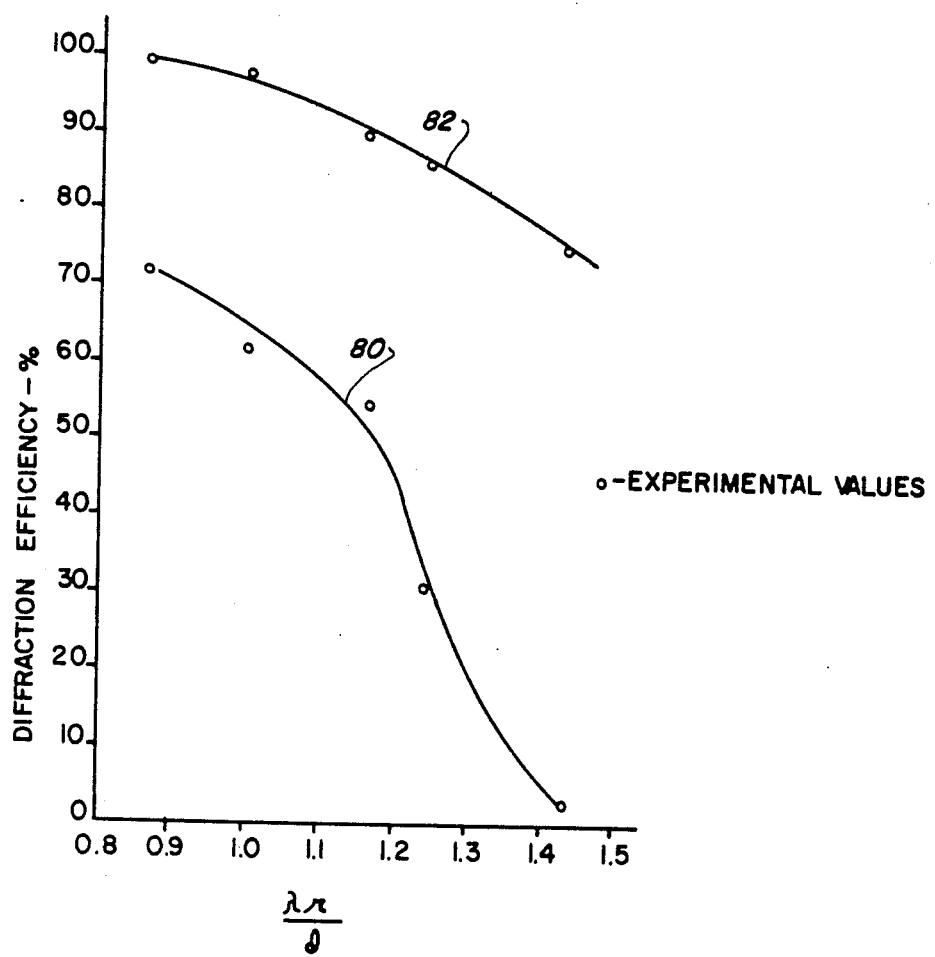
FIG. 12 is a graph plotting diffraction efficiency as a function of $\lambda_{r/d}$ ratio and as a function of incident light polarization.

Scalar diffraction theory predicts that the maximum diffraction efficiency that can be achieved with thin sinusoidal surface relief gratings is 34%. It has been known theoretically that, with metalized thin sinusoidal surface relief gratings, diffraction efficiencies of greater than 80% can be obtained for certain polarizations when $\lambda/d \geq 0.6$. According to the present invention, it has been discovered that the above-described making conditions of an unmetalized thin sinusoidal surface relief transmission type grating results in relatively high efficiencies. FIG. 12 shows using experimental data for grating diffraction efficiency as a function of $\lambda_r/d$ and incident light polarization and with $\theta_i = \theta_d$. Plot 80 is for P polarization and plot 82 is for S polarization.

DIFFRACTION NON-UNIFORMITIES

Figure 13:
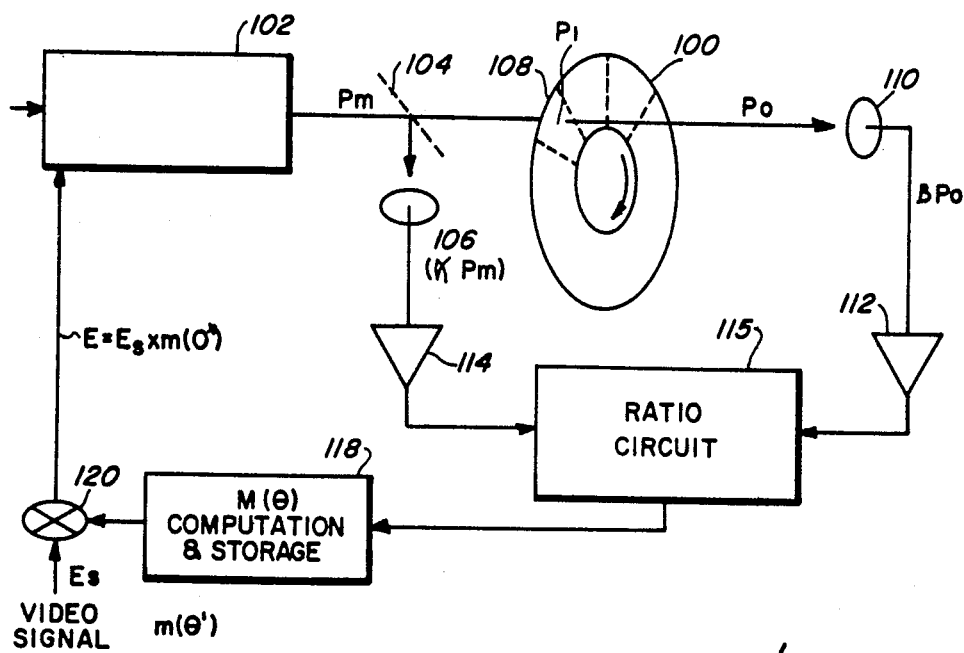
FIG. 13 is a schematic diagram showing a scanning system utilizing an exposure error correction circuit.

In the scanning system shown in FIG. 4, only the diffracted first order ray is shown but a zero-order diffracted component (not shown) is also present. This zero-order component is spatially stationary and has a power $P_o$ which may be compared with the power $P_m$ of reconstruction wavefront 20 incident on the grating. Applicant has devised a feedback technique which uses a correction signal derived from $P_o$ and $P_m$ to remove intensity errors in the deflected first order beams (of power $P_l$). These errors would normally arise from grating-to-grating diffraction efficiency differences or as intra-grating diffraction efficiency variations. FIG. 13 shows a correction circuit for the transmission spinner mode but the method described below is equally applicable to reflection holograms. Referring to FIG. 13, a correction signal is derived as a function of the rotational angle, $\theta_R$ of the holographic spinner 100. Laser modulator 102 is assumed to put out a beam power ($P_m$) which is proportional to the incident laser beam power and the modulator driver input voltage E(t), where E(t) is maintained within a reasonable range for linear operation. A small fraction of the beam power, $P_m$ from the modulator is diverted by splitter mirror 104 to light detector 106 whose output ($\alpha P_m$) is proportional to $P_m$. Likewise, a portion of the zero order beam power, $P_o$, from a PLDG 108 on spinner 100 is detected by light detector 110 to provide a signal $\beta P_o$ proportional to $P_o$ ($\alpha$ and $\beta$ are proportionality constants). The signals $P_m$ and $\beta P_o$ are amplified by amplifiers 112, 114 which are both adjusted so that the output of the following ratio circuit 115 is equal to $P_o/P_m$. The ratio $P_o/P_m$ will be a function of the angular position because of inter-facet and intra-facet diffraction efficiency variations. This ratio is related to the local diffraction efficiency ($D_E$) of the holographic grating by $$D_E(\theta) = \frac{P_1(\theta)}{P_m} = 1 - \frac{P_o(\theta)}{P_m} \quad (21)$$

If it is desired to simulate an arbitrary but constant diffraction efficiency, $D_o$, so that the scanning beam power is not affected by small local variations in D then a correction factor, $M(\theta)$, equal to $$M(\theta) = \frac{D_c}{D_E}(\theta) = \frac{D_c}{1 - \frac{P_o(\theta)}{P_m}} \quad (22)$$

is electronically derived in computation, and storage circuit 118. The correction factor, $M\theta'$ is multiplied in multiplier 120 by the incoming "video" signal, $E_s$ to provide a scanning beam power, $P_l$, which is proportional to the video signal, $E_s$, independent of local scanner diffraction efficiency. The symbol, $M(\theta)$ is used to indicate that a time base shift relative to $M(\theta)$ is often required to ensure that the correction factor is applied for the correct instantaneous position of the scanner, accounting for the several time delays which may occur in the electronics and modulator. This time base shift may vary from zero to many line scan times, depending on the mode of correction to be adopted.

It is obvious that the ratio $P_o(\theta)/P_m$ must be derived at a time when $P_m$ is sufficiently greater than zero so that $P_o/P_m$ may be computed with sufficient accuracy. This fact places certain restrictions on the correction modes. Likewise, since the modulator and driver electronics have a limited linear range, there are limitations on the selection of the constant, $D_c$, and the permissible variations in grafting diffraction efficiency, $D_E$. If the range of input voltages to the modulator driver electronics varies from zero to $E_{max}$ for linear operation, then the video signal $E_s$ must satisfy the inequality $$\frac{E_s}{E_{max}} \leq \frac{D_E(\theta)_{min}}{D_c} \quad (23)$$

to maintain linear operation of the modulator.

The signals required for correction may be derived by several other techniques. For example, if a self-modulated laser) e. g. a diode laser is used, the compensation signal is used to alter the output of the laser. If an acousto-optic laser modulator is used, the zeroth order beam from the modulator (which is usually discarded) may be used to compute $P_m$, since this zeroth order power and $P_m$ are linearly related. Also, a portion of the unmodulated laser beam may be diverted around the modulator, measured to generate an equivalent $P_m$ (signal) and optically directed to be incident on a facet. The $P_m$ signal derived before the modulator could be used to correct the combined modulator and spinner signal.

Figure 14:
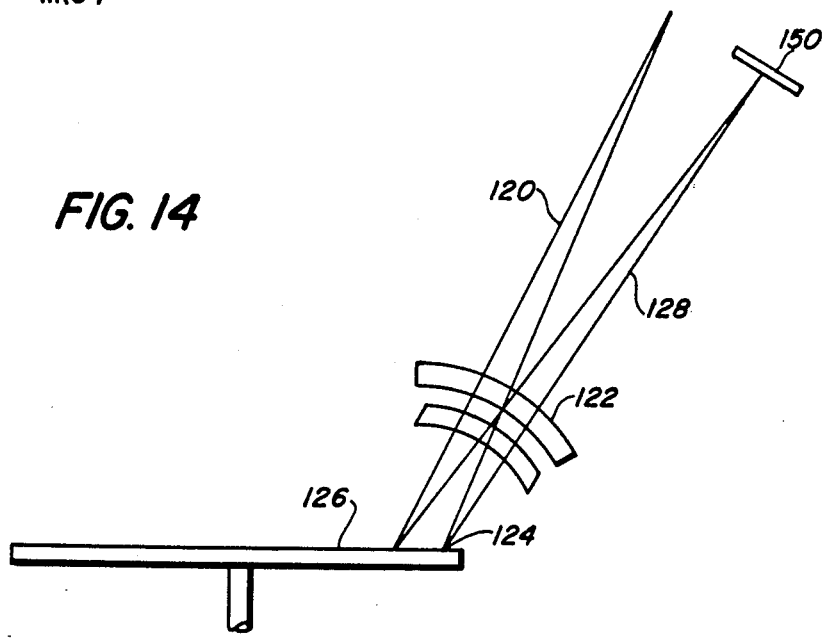
FIG. 14 is a second embodiment of a scanning system employing a reflective type spinner.

FIG. 14 illustrates the use of a reflective type scanning system constructed according to the invention. In this embodiment, reconstruction beam 120 emanating from a point source is collimated by lens 122 before reaching PLDG facet 124 formed on spinner 126. The diffracted beam 128 is focused by lens 122 onto image plane 150. This embodiment has the following advantages associated with it; the number of beam conditioning optics before the scanner is reduced: a smaller angular difference between incident and diffracted beam is allowed which is advantageous in many instances, and the focusing lens can be located closer to the spinner and, thereby, be of smaller size.

Although the disclosure has emphasized the use of plane linear diffraction gratings, there may be systems in which the facet possesses some optical power either as a result of having a varying grating period and/or because it is formed on a curved rather than plane surface. By incorporating power into the facets, it is possible in some applications to compensate the system for deficiencies. As an example, compensation could be implemented for the slight power change produced in a facet as a result of the grating period being distorted by the centrifugal force associated with high rotational velocities. Through the action of centrifugal force, a spinner undergoes slight elongation in the radial direction with the greatest elongation per unit cell of the spinner occurring near the center of the spinner. A PLDG facet residing on a high speed spinner will be altered very slightly in the following manner as a result of the substrate elongation; the grating lines of the facet will acquire a concave shape when viewed from the center of the spinner and the grating period will vary with the largest increase in period occurring toward the center of the spinner. Under the dynamic load of the centrifugal force, the PLDG is changed into a weak focusing lens whose center is located at a negative radial distance from the spinner. This lens effect can be eliminated by introducing the opposite lens power into the facet during the fabrication process, that is by utilizing a construction wavefront which appears to originate from a point source located at some corresponding positive radial distance from the spinner.

Although the present invention has been described as applicable to either thin surface gratings or thick (volume) gratings, thin surface gratings have a preferred advantage in that they may be conveniently replicated by non-optical means. It is well known that optical surfaces can be replicated by the technique in which the surface of a master is transferred to a substrate by a thin film of epoxy.

As a final point, and applying a slightly different perspective to what has gone before, the PLDG scanner is, in effect, a "flat polygon". The grating facets function, for all practical purposes, as plane mirrors. Almost all of the techniques developed to improve the performance of a polygon scanner can be also applied to the present device.

What is claimed is:

1. An optical scanning system including a spinner having formed thereon at least one plane linear diffraction grating having a constant grating period d,
   a reconstruction light source of wavelength $\lambda_r$ which provides a beam of light directed at an angle of incidence $\theta_i$ to illuminate said grating,
   means for rotating said spinner so that said grating rotates through a rotation angle $\theta_R$ and diffracts a portion of the incident light at a diffraction angle $\theta_d$
   said incidence angle $\theta_i$ having a value of between 0° and 89.445° said diffraction angle $\theta_d$, having a value between 38.17° and 90°, the ratio of the wavelength $\lambda_r$ to the spacing d having a value of between 1 and 1.618.

2. An optical scanning system according to claim 1 wherein the values of $\theta_i$ and $\theta_d$ are determined by the following relationship:

$$\sin \theta_i = \lambda_r/d - d/\lambda_r$$

and $$\sin \theta_d = d/\lambda_r.$$

3. An optical scanning system according to claim 1 wherein the values of $\theta_i$ and $\theta_d$ are determined by the following relationship:
$$\sin \theta_i = (\lambda_r/d - d/\lambda_r) \sec \theta_R$$

and $$\sin \theta_d = (1 - \sec \theta_R)\lambda_r/d + d/\lambda_r.$$

4. An optical scanning system according to claim 1 wherein said spinner is of the transmissive type and wherein $\theta_i \approx \theta_d \approx 45°$.

5. An optical scanning system according to claim 1 wherein said grating is formed by ruling techniques.

6. An optical scanning system according to claim 1 wherein said grating is formed as optical thin surface relief grating.

7. An optical scanning system according to claim 1 wherein said grating is formed as an optical volume grating.

8. An optical scanning system according to claim 1 further including means to collimate said reconstruction light source and an optical lens positioned to intercept and focus said diffracted beam onto an image plane to produce a scan line therein.

9. An optical scanning system according to claims 7 or 8 wherein said spinner is of the reflective type and said lens functions as both a source collimator and final imaging element.

10. An optical scanning system according to claim 1 further including an optical lens placed in the path of said reconstruction light source to cause said light to begin to converge before incidence onto said spinner ultimately causing said diffracted light to be focused onto an image plane.

11. The optical scanning system according to claim 1 wherein said diffracted light has a first order and zero order component, said system further including means to modulate said reconstruction wavefront;
    means for sampling and comparing a portion of the intensity of light incident on the spinner normal $P_m$ with a portion of the zero order beam power $P_o$ to form an output signal equal to the ratio of $P_o/P_m$;
    circuit means for comparing said output ratio to a predefined correction factor to provide a correction signal; and
    means for applying said correction signal to said modulator.

12. A method of constructing an optical scanning system comprising the steps of:
    providing a spinner member having disposed thereon a photosensitive medium;
    splitting a plane object beam of coherent radiation having a wavelength $\lambda_f$ into a first object beam and a second reference beam, both beams lying in the plane formed by the spinner normal and the spinner diameter;
    directing said first beam to impinge on said medium at an angle $\phi_o$ with respect to spinner normal;
    directing said second beam to impinge on said medium at an angle $\phi_r$ with respect to normal and in the same plane as said first beam, intersecting the first beam at said medium to form an interference fringe pattern constituting a plane linear diffraction grating having a constant grating period d,
    directing a third reconstruction beam of radiation to impinge onto said grating at an angle of incidence $\theta_i$ said angle lying between 0° and 89.445°, the wavelength $\lambda_r$ of said reconstruction beam having a value between 1 and 1.618 times the value of grating period d;
    providing means for rotating said spinner so that said grating rotates through a rotation angle $\theta_R$ and diffracts a portion of the incident light at a diffraction angle $\theta_d$ lying between 38.17° and 90°.

13. The method according to claim 12 wherein $\lambda_f$ is equal to $\lambda_r$.

14. The method according to claim 12 wherein $\lambda_f$ is not equal to $\lambda_r$.

15. The method according to claim 12 wherein said grating is formed as a thin surface relief grating and including the additional step of replicating at least a portion of said grating onto another spinner surface.

16. A method of constructing an optical scanning system as defined in claim 12 including the additional steps of forming said diffraction gratings slightly non-planar/linear to act as a weak lens and of compensating for the effects of said lens during said forming step.

17. The method of claim 12 wherein said plane object beam is incident in a beam splitter element forming part of a prism assembly, said beam splitter element forming said first object and second reference beams which are reflected from the sides of the prism assembly onto the medium at the angles $\theta_o$ and $\theta_r$.

* * * * *

UNITED STATES PATENT AND TRADEMARK OFFICE
CERTIFICATE OF CORRECTION

PATENT NO. : 4,289,371
DATED : September 15, 1981
INVENTOR(S) : CHARLES J. KRAMER It is certified that error appears in the above-identified patent and that said Letters Patent are hereby corrected as shown below:

IN THE ABSTRACT:

Last line, change "approximate" to --approximates--.

Col. 2, line 16, add --)-- after "differences".

Col. 5, line 43, add --is-- between "that" and "caused".

Col. 6, line 48, change "i" to --in--.

Col. 8, line 56, delete "," before "and".

Col. 9, line 35, add an equal sign between "$\theta_i$" and "$\theta_d$".

Signed and Sealed this

Nineteenth Day of January 1982

[SEAL]

Attest:

GERALD J. MOSSINGHOFF

Attesting Officer

Commissioner of Patents and Trademarks